(12) United States Patent
Boulkenafed et al.

(10) Patent No.: US 10,475,161 B2
(45) Date of Patent: Nov. 12, 2019

(54) MULTI-RESOLUTION IMAGE SYSTEM

(71) Applicant: DASSAULT SYSTEMES, Velizy Villacoublay (FR)

(72) Inventors: Malika Boulkenafed, Courbevoie (FR); Jean-Julien Tuffreau, Montreal (CA)

(73) Assignee: DASSAULT SYSTEMES, Velizy Villacoublay (FR)

( * ) Notice: Subject to any disclaimer, the term of this patent is extended or adjusted under 35 U.S.C. 154(b) by 0 days.

(21) Appl. No.: 15/370,326

(22) Filed: Dec. 6, 2016

(65) Prior Publication Data

US 2017/0169544 A1   Jun. 15, 2017

(30) Foreign Application Priority Data

Dec. 12, 2015  (EP) .................................... 15306995

(51) Int. Cl.
*G06T 3/40* (2006.01)
*G06T 1/60* (2006.01)

(52) U.S. Cl.
CPC .............. *G06T 3/4038* (2013.01); *G06T 1/60* (2013.01); *G06T 2200/24* (2013.01)

(58) Field of Classification Search
CPC ...... G06T 3/4038; G06T 1/60; G06T 2200/24
USPC ........................................ 345/619, 629, 634
See application file for complete search history.

(56) References Cited

U.S. PATENT DOCUMENTS

2010/0321399 A1   12/2010 Ellren et al.

OTHER PUBLICATIONS

Laxmaiah, M., and A. Govardhan. "Gcube Indexing." arXiv preprint arXiv:1308.4048 (2013), pp. 95-106.*

(Continued)

*Primary Examiner* — Sarah Lhymn
(74) *Attorney, Agent, or Firm* — Oblon, McClelland, Maier & Neustadt, L.L.P.

(57) ABSTRACT

The invention notably relates to a memory storage having a linear track and having recorded thereon a multi-resolution image system of an object, the multi-resolution image system including a set of images, each image representing the object and having a respective resolution, wherein the recording is according to a continuous injection from a space-filling curve of the set of images to the linear track, the space-filling curve interlaces the different images, and the intersection between the space-filling curve and each image is on a Hilbert curve.

The invention improves the way to record a multi-resolution image system of an object on a memory storage.

23 Claims, 4 Drawing Sheets

(56) References Cited

OTHER PUBLICATIONS

Hu, Chunyang, et al. "Actgis: A web-based collaborative tiled geospatial image map system." Computers and Communications (ISCC), 2010 IEEE Symposium on, IEEE, 2010 (pp. 521-528).*
Lawder, J. K., & King, P. J. (Jul. 2000): "Using space-filling curves for multi-dimensional indexing", In British National Conference on Databases (pp. 20-35). Springer, Berlin, Heidelberg.*
Zhang, Huijie, et al. "Multiscale feature model for terrain data based on adaptive spatial neighborhood." Mathematical Problems in Engineering 2013 (2013) (pp. 1-12).*
Extended Search Report dated May 23, 2016 in European Patent application No. 15306995.0.
Nick Johnson, et al., "Damn Cool Algorithms: Spatial indexing with Quadtrees and Hilbert Curves", Nick's Blog, Nov. 2009, XP055272407, pp. 1-10.
H.V. Jagadish , et al., "Linear Clustering of Objects with Multiple Attributes", ACM, 1990, pp. 332-342.
Bongki Moon, et al., "Analysis of the Clustering Properties of the Hilbert Space-Filling Curve", Jan. 2001 vol. 13, Issue 1, 36 pages.

* cited by examiner

MULTI-RESOLUTION IMAGE SYSTEM

CROSS-REFERENCE TO RELATED APPLICATIONS

This application claims priority under 35 U.S.C. § 119 or 365 to European Application No. 15306995.0, filed Dec. 12, 2015. The entire teachings of the above application(s) are incorporated herein by reference.

FIELD OF THE INVENTION

The invention relates to the field of computer science, and more specifically to a memory storage having recorded thereon a multi-resolution image system of a terrain.

BACKGROUND

Different applications can be found on the market which provide a 2D and/or a 3D experience that includes image rendering with a multi-resolution image system, such terrain rendering. Examples of such applications are the following products (registered trademarks): GOOGLE Earth, GOOGLE Maps. GPS-based applications (e.g. GPS navigation) and flight simulation applications are other examples of applications that implement terrain rendering. Such applications usually make use of a multi-resolution image (e.g. map) system of an object (e.g. a terrain) to perform/update the rendering upon user-interaction. A multi-resolution map system comprises a usually very large set of maps that represents the terrain. Such a system usually needs to be stored on large memory storage (e.g. hard drive), and usually the maps do not fit all on the same time on fast memory (RAM, video memory). The application needs to constantly load and/or unload maps, which significantly affects the performances (e.g. frame rate) of the application. Several solutions exist to decrease the issues related to the loading operation. For example, maps can be compressed on the hard drive using compression algorithms (JPEG, JPEG2000, PNG, HD PHOTO are examples of such compressed formats).

Within this context, there is still a need for an improved way to record a multi-resolution image system of an object on a memory storage.

SUMMARY OF THE INVENTION

It is therefore provided a memory storage having a linear track and having recorded thereon a multi-resolution image system of an object, the multi-resolution image system including a set of images, each image representing the object and having a respective resolution, wherein the recording is according to a continuous injection from a space-filling curve of the set of images to the linear track, the space-filling curve interlaces the different images, and the intersection between the space-filling curve and each image is on a Hilbert curve.

The space-filling curve may consist of the intersection between the space-filling curve and all images, and links between pairs of images, a link always being between an image having a first resolution and an image having a second resolution, the second resolution being next above the first resolution in the multi-resolution image system.

The images may each comprise tiles that each cover a respective zone, each tile of the image having the first resolution being associated to the tiles of the image having the second resolution that cover together the zone respective to the tile to which they are associated.

Alternatively, the space-filling curve may traverse all the tiles of the image having the second resolution that cover together the zone, before traversing the tile to which they are associated. In such a case, the space-filling curve may traverse a part of the tiles of the image having the second resolution that cover together the zone, before traversing the tile to which they are associated. And optionally the part of the tiles may be half of the tiles.

In all cases, the object may be a terrain and the images may be maps.

It is further provided a computer-implemented method for producing such a memory storage. The method comprises providing a memory storage having a linear track; providing a multi-resolution image system of an object; and recording the multi-resolution image system on the memory storage according to the continuous injection.

It is further provided a computer-implemented method for object rendering based on such a memory storage. The method comprises rendering at least a part of one or several of the images of the multi-resolution image system of the object, the rendering being updated according to continuous horizontal and/or vertical moves within the images.

It is further provided a computer program comprising instructions for performing any or both the above methods.

It is further provided a computer readable storage medium having recorded thereon the computer program.

It is further provided a system comprising a processor coupled to a graphical user interface, to a memory having recorded thereon the computer program, and/or to a memory storage, such as the above provided memory storage.

BRIEF DESCRIPTION OF THE DRAWINGS

Embodiments of the invention will now be described, by way of non-limiting example, and in reference to the accompanying drawings, where.

DETAILED DESCRIPTION OF THE INVENTION

The multi-resolution image system includes a set of images (i.e. pieces of data that allow a 2D graphical representation) that each represent an object (i.e. the same object) at a respective resolution (i.e. level of details). The images may be any type of images, such as planar or relief maps, photos, artificial images, or CAD model and/or renderings. The object may itself be any type of object, such as a terrain, a manufacturing product, a real-world object, an artificial or simulated object, a CAD model. In any case, the images at least contain data that allow the rendering of the object at different resolutions, and thereby the display of a 2D graphical representation of the object at different resolutions. The presence of different images (e.g. of the same object) at different resolutions allow (e.g. a user) to interactively "navigate" within the set of images and thereby update the renderings (location—on the object—of the rendering and/or resolution). In the following, for the purpose of illustration and because this is a context where data sizes at stake in order to run rendering applications are particularly significant, the discussion focuses on the example where the images are maps and the object is a terrain, such that the memory storage has recorded thereon a multi-resolution map system of the terrain. However, the following discussions apply similarly to other types of objects.

Figure 1:
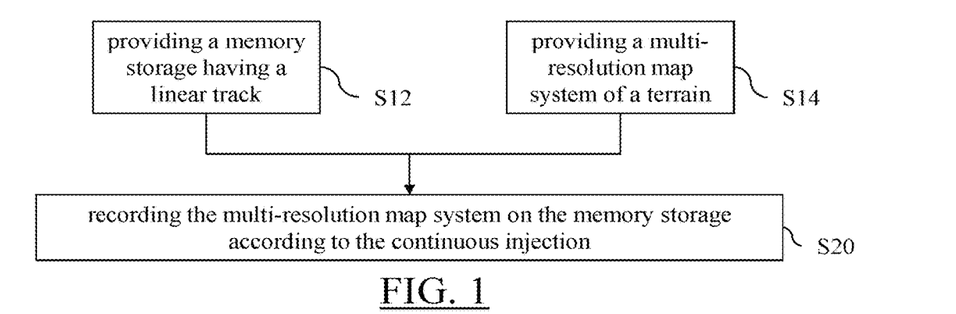
FIG. 1 shows a flowchart of an example of the method for producing the memory storage.

As shown on FIG. 1, the provided memory storage is obtainable and can be produced by a computer-implemented method that comprises providing S12 a memory storage having a linear track and providing S14 the multi-resolution map system. The method then comprises recording S20 the multi-resolution map system on the memory storage according to the continuous injection. The recording S20 may be performed in any way, and according to standard hardware/software, as long as the recording structure constraint of the continuous injection is respected. The recording S20 may be performed from scratch, for example by a client receiving at S14 the multi-resolution map system from a distant server. Alternatively the recording may constitute a reorganization of already recorded data, by way of a defragmentation of the multi-resolution system already recorded on the memory storage (e.g. but not respecting the continuous injection prior to the defragmentation), the data being merely retrieved at S14 from the memory storage. The memory storage may be used in any application method, such as in the terrain rendering applications discussed later.

Methods discussed herein are computer-implemented. This means that the steps (or substantially all the steps) of these methods are executed by at least one computer, or any system alike. Thus, steps of the method are performed by the computer, possibly fully automatically, or, semi-automatically. In examples, the triggering of at least some of the steps of the method may be performed through user-computer interaction. The level of user-computer interaction required may depend on the level of automatism foreseen and put in balance with the need to implement user's wishes. In examples, this level may be user-defined and/or pre-defined.

A typical example of computer-implementation of these methods is to perform these methods with a system adapted for this purpose. The system may comprise a processor coupled to a memory and a graphical user interface (GUI), the memory having recorded thereon a computer program comprising instructions for performing the method. The memory may also store a database. The memory is any hardware adapted for such storage, possibly comprising several physical distinct parts (e.g. one for the program, and possibly one for the database). Notably, the system may also comprise a memory storage coupled to the processor. The memory storage may possibly have recorded thereon the multi-resolution map system (possibly according to the continuous injection), depending on whether it is considered before the execution of S20 or after (being noted that in the following, when it is referred to the "memory storage", it is generally considered that it has recorded thereon the multi-resolution map system according to the continuous injection).

Figure 2:
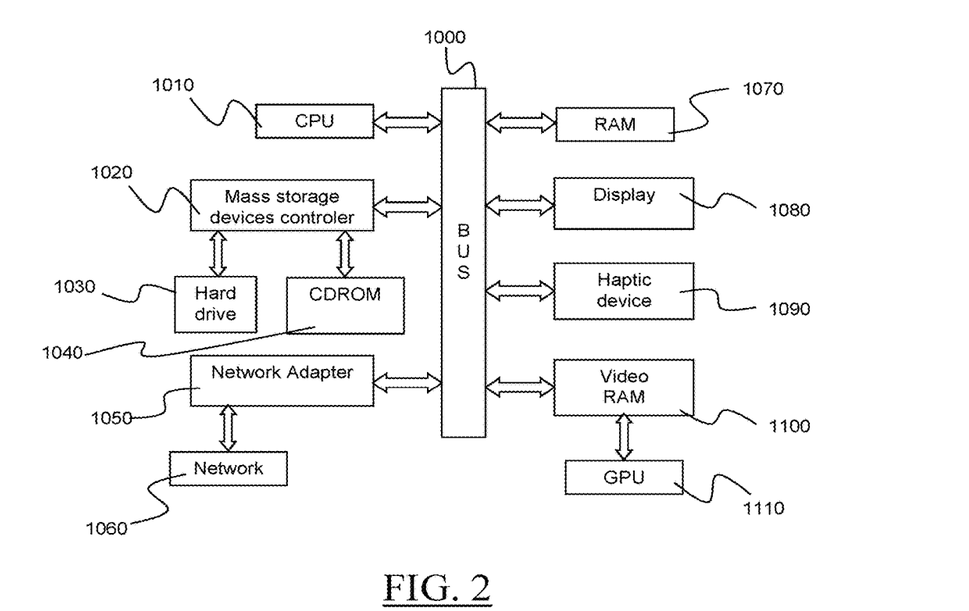
FIG. 2 shows an example of the system including the memory storage.

FIG. 2 shows an example of such a system, wherein the system is a client computer system, e.g. a workstation of a user. The client computer of the example comprises a central processing unit (CPU) 1010 connected to an internal communication BUS 1000, a random access memory (RAM) 1070 also connected to the BUS. The client computer is further provided with a graphical processing unit (GPU) 1110 which is associated with a video random access memory 1100 connected to the BUS. Video RAM 1100 is also known in the art as frame buffer. A mass storage device controller 1020 manages accesses to the memory storage having possibly recorded thereon the multi-resolution map system (in the example, a mass memory device, i.e. hard drive 1030). Mass memory devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks 1040. Any of the foregoing may be supplemented by, or incorporated in, specially designed ASICs (application-specific integrated circuits). A network adapter 1050 manages accesses to a network 1060. The client computer may also include a haptic device 1090 such as cursor control device, a keyboard or the like. A cursor control device is used in the client computer to permit the user to selectively position a cursor at any desired location on display 1080. In addition, the cursor control device allows the user to select various commands, and input control signals. The cursor control device includes a number of signal generation devices for input control signals to system. Typically, a cursor control device may be a mouse, the button of the mouse being used to generate the signals. Alternatively or additionally, the client computer system may comprise a sensitive pad, and/or a sensitive screen.

The computer program may comprise instructions executable by a computer, the instructions comprising means for causing the above system to perform the method. The program may be recordable on any data storage medium, including the memory of the system. The program may for example be implemented in digital electronic circuitry, or in computer hardware, firmware, software, or in combinations of them. The program may be implemented as an apparatus, for example a product tangibly embodied in a machine-readable storage device for execution by a programmable processor. Method steps may be performed by a programmable processor executing a program of instructions to perform functions of the method by operating on input data and generating output. The processor may thus be programmable and coupled to receive data and instructions from, and to transmit data and instructions to, a data storage system, at least one input device, and at least one output device. The application program may be implemented in a high-level procedural or object-oriented programming language, or in assembly or machine language if desired. In any case, the language may be a compiled or interpreted language. The program may be a full installation program or an update program. Application of the program on the system results in any case in instructions for performing the method.

The memory storage has recorded thereon the multi-resolution map system in an improved way. Notably, thanks to the specific "continuous injection" relation between the maps and the linear track, via the space-filling curve, and to the fact that the space-filling curve interlaces the different maps and intersects each map forming a Hilbert curve, the memory storage ensures that, when involved in a terrain rendering method and upon moves within the map and/or between two interlaced maps, physical moves of the head/reader are relatively small (in terms of distance, counted e.g. in millimeters or micrometers) and thus loading is relatively fast (in terms of time, counted e.g. in seconds or milliseconds).

The memory storage may be any hardware system (e.g. embedding software) adapted for persistent (i.e. non-volatile) memory storage. Indeed, the multi-resolution map system may be of a size too large (e.g. magnitude 1 teraoctet or To, i.e. $10^{12}$ octets, e.g. larger than 0.1 or 0.5 To and/or lower than 2 or 10 or 100 To) for being fully stored on volatile memory. This is particularly true when the memory storage is included (i.e. physically coupled) to the same machine as a client system running an application based on the multi-resolution map system, but this is also true when the memory storage is included to the server system of such application. The memory storage may for example be any type of disk drive and/or hard drive, such as a hard disk drive (HDD).

As widely known in this field, such a memory storage typically has at least one linear track to record information/data (most often several concentric linear rings or cylinders, but sometimes a single track, such as in the case of a floppy disk). During any series of read and/or write operations performed by the memory storage system, the physical move of the head/reader of the memory storage system (e.g. a disk read-and-write head) is optimal (i.e. minimal) in terms of distance and thus time when the operations are allocated continuously and sequentially along the linear track. The memory storage makes use of this property to optimize the recording of the multi-resolution map system, as discussed in more details in the following.

It is noted that the following discussion applies without any loss of generality to cases where the linear track is not single (e.g. the multi-resolution map system being too large in terms of a memory size for a single linear track). Indeed, in such cases, the present discussion may directly apply, for example if "connections" between the several linear tracks are performed (which can be done in any way by the skilled person). For example, several linear tracks of the memory storage, for example adjacent linear tracks (still for a minimal move of the head), may be sequentially connected, thereby defining a global linear track—i.e. an accumulation of the single and different linear tracks considered—along the connected linear tracks and their connection(s). This is all known per se from this field. The following discussion thus refers to a single linear track, without any loss of generality, for the sake of clarity.

The memory storage has recorded thereon (i.e. it physically stores) a multi-resolution map system of a terrain. The term "terrain" designates any area of land. A "multi-resolution map system" of a terrain is, as known per se, a set of organized data that includes a set of maps of the terrain. Each map represents the terrain (i.e. at least a part thereof) at a respective resolution. This means that each map contains data that allow a rendering (and thus a graphical display) of the terrain at its respective resolution. Any type of rendering can be contemplated (e.g. 2D and/or 3D, e.g. color and/or grey-scale). Data representing the terrain are thus stored on dedicated physical components of the memory storage (and more specifically on the linear track, as explained below). The data can be any type of data allowing a rendering of the terrain, according to the contemplated application of the multi-resolution map system.

Such a data structure can be used by many different applications (such as the ones mentioned earlier) that include a rendering of at least a part of one or several of the maps of the multi-resolution map system of the terrain, e.g. upon user-interaction and/or automatic mode(s) of the application. Classically, when such applications are running, the rendering is (continuously) updated (i.e. the rendering evolves/is modified) according to continuous horizontal and/or vertical moves within the maps (combinations thereof being possible), such moves being possibly included within moves commanded by the user and/or any process of the application. A horizontal move is a move with respect to a fixed resolution (in other words, a horizontal move is a request sent to the application to render a different part of the terrain, but keeping the current resolution). A vertical move is a move with respect to a fixed point of the terrain (in other words, a vertical move is a request sent to the application to render the terrain while keeping the fixed point at the same position—within the rendering—and modifying the resolution, i.e. typically or zoom-in or zoom-out). Such moves are continuous, meaning that there is no "jump" in the evolution of the rendering from a part of the map to another or from a resolution to another. It is noted that the notion of continuity is to be understood from the point of view of a computer-implementation of such method, where data are numeric.

Yet in other words, at each given time, at least a given part of the terrain is rendered at a given resolution. Now, depending on the specific schedule—at that time—of the contemplated application (for example, in a multi-resolution map viewing application, such as Google maps, said schedule being defined by the sequence of actions performed by the user—if any—, e.g. including any or a combination of: moving North, East, South and/or West, and/or zooming in and/or out, e.g. performed as classical with mouse clicks and/or touch gestures), the part of the terrain to be rendered and/or the resolution at which the rendering is to be performed is updated e.g. continuously (being noted that the continuous update does not necessarily imply that the rendering is constantly amended, as pauses can obviously be implemented, for example when the user pauses to observe a particular feature of a map).

Upon any move and the rendering being thereby updated, different parts of the multi-resolution map system need to be loaded from the memory storage into the memory used by the application (e.g. assigned volatile memory). When the application runs with the above-mentioned moves, the specific way that the multi-resolution map system is recorded on the memory storage allows a gain of time for such loading (although of course, this does not forbid the application to also allow "jumps", if necessary).

Indeed, the recording is according to a continuous injection from a space-filling curve of the set of maps to the linear track. In other words, the set of maps of the multi-resolution map system is not stored/recorded on the memory storage in any way, such as randomly or according to the default operating system and/or memory storage behavior. Rather, the recording takes into account the sequence of recording blocks of the linear track and stores the different pieces of data that form the multi-resolution map system respecting a specific structure/schema. In order to understand the structure of the recording, it is referred in the following to specific schemes (i.e. examples of S20), although the recording method is not limited to such schemes, as any scheme achieving the required structure may equivalently be contemplated. In an example, the recording scheme consists in virtually following the space-filling curve, and as corresponding pieces of data of the multi-resolution map system are encountered, the recording scheme writes/stores them sequentially and continuously on the blocks of the linear track. Indeed, the space-filling curve "fills" the set of maps, meaning that the space-filling curve is a curve that conceptually traverses/browses all locations of all the maps of the set (i.e. a location being the smallest unit of area covered the map, a map being a finite—and discrete—partitioning of all its locations, e.g. such as "tiles" discussed later), and such locations correspond to respective pieces of data (i.e. minimal data that allow the rendering of such locations, being noted that such pieces of data are independent one of another, as known per se). In other words, pieces of data each pertaining to a respective location of the map are encountered one-by-one and recorded one-by-one on the linear track (thus, linearly, continuously, and sequentially). This is the meaning of the expression "according to a continuous injection from a space-filling curve of the set of maps to the linear track" (the injection corresponding to the composition, starting from the domain of a parameterization of the space-filling curve, of such parameterization with the recording function—that allocates pieces of data to respective blocks of the linear track).

As known, a space-filling curve fills the space continuously. In the present case, the space-filling curve traverses the set of maps continuously. This allows exploiting the continuity of user-actions and/or rendering updates in applications based on the multi-resolution map system, such that the memory storage head travels relatively little physical distance for a given running of such an application, notably with respect to horizontal moves.

Now, the intersection between the space-filling curve and each map is on a Hilbert curve. This means that for each map of the set of maps of the multi-resolution map system, there is a Hilbert curve which can be defined on the map and which supports the space-filling curve when the space-filling curve traverses/fills (or is supported by) the respective map. As known per se (and as further detailed later), Hilbert curves form a specific category of 2D space-filling curves. Respecting the specific schema of a Hilbert curve proves particularly efficient (in terms of distance travelled by the memory storage head) in the context of applications based on the multi-resolution map system.

Furthermore, the space-filling curve interlaces the different maps. This merely means that the curve connects all the maps of the set via links between pairs of maps. Actually, the space-filling curve consists exactly of the intersection between the space-filling curve and all maps, and such links between pairs of maps. This ensures that the different maps of the set are recorded together on the linear track, and thus that the memory storage head travels relatively little physical distance with respect to vertical moves as well.

In an example, a link is always between a map having a first resolution and a map having a second resolution, the second resolution being next above the first resolution in the multi-resolution map system (or equivalently the first resolution being next above the second resolution, as the link can be seen as not directed, regardless of the direction according to which the space-filling curve is traversed upon the recording S20 and thus considered in the definition of the continuous injection). As mentioned earlier, the maps of the multi-resolution map system each have a respective resolution, being noted that two maps may have a same resolution (if the maps cover different zones of the terrain, being however also noted that, without any loss of generality, all such maps of a same resolution can be virtually considered as a single map covering the terrain at the considered resolution). The set of resolutions can be ordered gradually, such that from the lowest resolution to the resolution just below the highest resolution, each resolution has a "next above" resolution (i.e. the resolution that comes next in the ordering). The interlacing may thus be ordered as the resolutions (in other words, the interlacing is ordered following the order between the resolutions of the maps) such that maps of the set are connected relative to such sequence of resolutions. This improves the relative reduction of physical distance travelled by the memory storage head with respect to vertical moves.

Furthermore, the interlacing may be such that for at least one pair of maps (e.g. all pairs—e.g. of consecutive resolutions—but the pair formed by the lowest resolution map(s) and the next above resolution map(s)), the number of links is higher or equal to 2—e.g. this number being equal to 1 in the case of the exception (and in an example equal to the number of tiles of the map of lowest resolution in the pair, e.g. the interlacing linking all such tiles to a group of tiles of the map of the next above resolution). In other words, the interlacing is in a sense spread on the maps (rather than having the space-filling curve finishing filling all map(s) of one level of resolution before starting filling map(s) of the next level of resolution. Each tile of the map having a first resolution may be associated to the tiles of the map having the second resolution that cover together the zone respective to the tile to which they are associated. As known, in a multi-resolution system the maps may comprise tiles that each cover a respective zone, the tiles of a map thereby partitioning the map. Now, the structure of the multi-resolution system may be a tree structure (for example, a quad tree), such that a tile of a given resolution corresponds to several tiles of the next above resolution (four such tiles, in case of a quad tree), the correspondence being such that the area of the terrain covered by the tile of the first resolution is (e.g. exactly) the same as the area of the terrain covered together by said (e.g. four) tiles of the next above resolution (the expression "covered together" referring to the fact that the tiles cover different areas such that such areas are cumulated/added/joined for assessment of said correspondence). This specific recording structure ensures an optimal management of the distance travelled by the memory storage head, as a good compromise with the need to handle both the possibility of horizontal moves as well as the possibility of vertical moves.

It may thus be proposed a method for storing an image for rapid access on a computerized linear storage means, the image being recorded on the storage means according to different levels of detail. Each level of detail comprises a set of tiles of the image. The tiles of the different levels of detail are stored according to a path on the storage means following a "Hilbert curve-like" curve, the path additionally following different levels in two-way.

In an example, the memory storage is such that a set of images are stored on a linear storage (e.g. a hard drive). The set of images is used by an application as a multi-resolution system (e.g. a relationship between the images forms a hierarchical tree). The physical location of the data (e.g. clusters on a hard drives) are ordered on the linear storage to reflect the order given by the indexation with a space-filling curve. This space filling curve has the following properties. It maps the multi-resolution system to a linear space. It stays close to Hilbert curves, as this ensures the best performance with horizontal moves. It visits above/below levels quite often so that vertical moves ("zoom in/zoom out") are not completely penalized.

Example features of terrain rendering are now discussed with reference to FIGS. 3-6. In the examples, the memory storage relates to 3D applications with terrain rendering.

Figure 3:
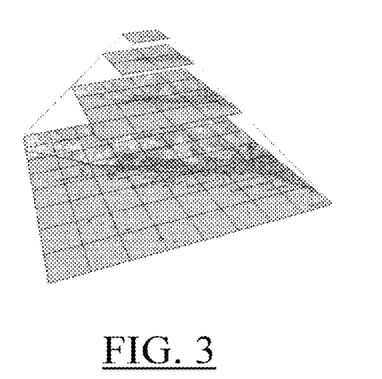
FIGS. 3-13 illustrate a multi-resolution map system and the recording thereof on the memory storage and/or terrain rendering based on such memory storage.
Figure 4:
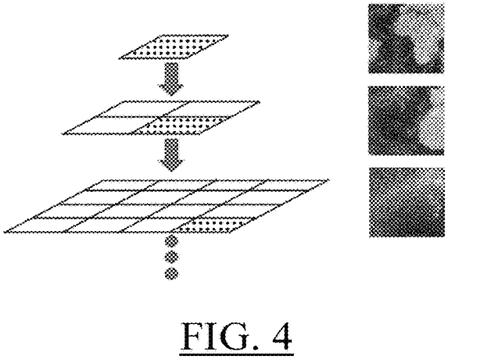

Applications that involve terrain rendering may involve a terrain represented by a multi-resolution map system, for example a hierarchical system of maps/images. These maps can store various data such as diffuse color (aerial photography, satellite imagery or artificial colored images) or ground elevation (height maps or displacement maps). FIG. 3 and FIG. 4 show examples of such maps. Specifically, FIG. 3 shows an example of a multi-resolution system of maps that forms a quad tree, each tile from one level having four corresponding tiles on the next level. And FIG. 4 shows another example of a multi-resolution system of maps. On the right side are shown tiles from different levels. Tiles from high levels cover more area. Tiles from low levels (corresponding to high resolution) are more detailed. Such applications may also involve a rendered image of the terrain to be shown to the user. This can be a simple 2D top-down view (such as in Google Maps, for example) or a 3D rendered image, for example from a viewpoint decided by the user. Such applications may also involve the ability for the user to navigate in the scene (move the view point from which the rendered image of the terrain is generated). There may be three kinds of movements: 1/ Horizontal moves also called "flight over": the user flies above the terrain continuously but keep the same elevation from the "sea level". 2/ Vertical moves also called "zoom in/zoom out": the user stands over the same point but changes its elevation from the "sea level" continuously. 3/ Teleportation also called "jump": the user changes its position instantaneously (for example, goes from Paris to New York in a blink without transition). The following URL provides more details and definitions on such well-known concepts: http://en.wikipedia.org/wiki/Terrain_rendering. The multi-resolution system may thus be a hierarchical tree (e.g. a quad-tree) where each node holds a map/image representing a part of the whole world with a given level of details. Children of a node may be sub-images of that node with a higher level of details (as shown on FIG. 3).

In an example in the case of 2D top-down view, the terrain is represented by a multi-resolution system of maps. On the upper part of the system, maps cover large parts of the terrain but with only few details. These maps are usually used in the display process when the user's viewpoint is far from the ground (for example, the user needs to see a whole continent but without details). On the lower part of the system, maps cover small parts of the terrain but with plenty of details. These maps are usually used in the display process when the user's viewpoint is close to the ground (for example, the user needs to see a street without every human-sized details). The job of the display process is to load from the database where every map is stored (hard drive, remote server, etc.) to the immediate memory (RAM, video memory, etc.) only the maps which are required depending on the user viewpoint (e.g. position and orientation).

In an example in the case of 3D view, the terrain is displayed as a 3D model on the screen. However in most cases this 3D model is a grid mesh or a spline surface generated in the runtime in the screen space by the application. Vertices of this mesh (control points of the spline surface) are displaced according to elevation/displacement data stored as a set of maps. So this falls back to the situation where the terrain is represented by a multi-resolution system of maps. Various papers are focused on how to generate this 3D mesh efficiently (e.g. via clip mapping, seamless patches, etc.). An index of such papers can be found at the following URL: http://vterrain.org/LOD/Papers/. This subject is not discussed any further in the following, as it is sufficient to know that all cases deal with the same representation: a multi-resolution system of maps. A combination with rendering of non-terrain objects (such as trees, buildings, rivers) is also common, but this is also out of the scope of the present discussion.

As mentioned earlier, the set of maps which represent the terrain may be very large and loading time may be an issue. The solution proposed by the memory storage is related to the physical position of the files on the hard drive. Indeed, on the hard drive data are physically stored in clusters. It is noted that the way data is stored on the hard drive is not related to the "directory tree" view of the file system. Indeed, two files which a user may think are close in the "directory tree" view (e.g. two files in the same file folder) can actually be stored on clusters very distant from each other. Also, a single content file can be stored on several unconnected clusters. In a sense, the hard drive can be seen as a linear storage, and performances of several "read" operations are affected by the distance between the read clusters, as the read/write head has to move from one physical location to another. It is also possible to create software which reorganize the data on the disk. This is what disk defragmenters do (and this is documented for example in details at the following URL: http://en.wikipedia.org/wiki/Defragmentation) with simple assumptions (e.g. gathering data of the same file on the same physical location, minimizing the free space between clusters in use, and so on).

Figure 5:
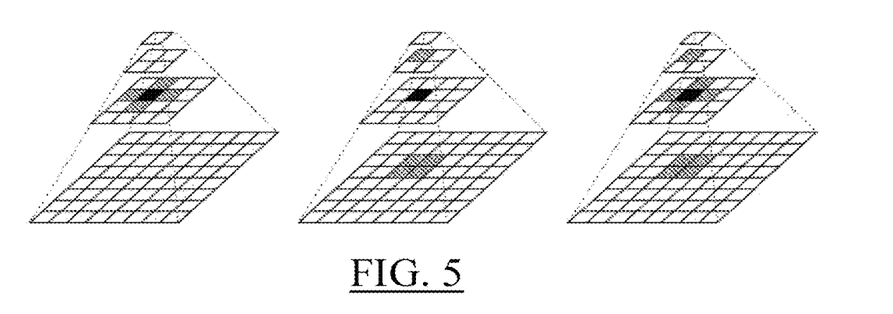

The memory storage thus offers a solution in all cases where one has to deal with a multi-resolution system of images (e.g. maps), the application needs to constantly load/unload these maps (very likely to be the performance bottleneck of the application), the maps are image files physically stored on a linear storage, and which maps need to be loaded after another is strongly related to how the user navigates into the scene (that is, "flight over", "zoom in/zoom out", or "jump"). FIG. 5 shows (in grey) maps that are likely to be loaded after another (in black) in case of a "flight over" (left), a "zoom in/zoom out" (middle), or a combination of both (right). "Flight over" implies that the application needs to load maps that are close in the same level of the multi-resolution representation. "Zoom in/zoom out" implies that the application needs to load maps that are in the next higher/lower level of the multi-resolution representation. "Jump" is by essence an unpredictable move. And as such it is not further discussed in the following.

Figure 6:
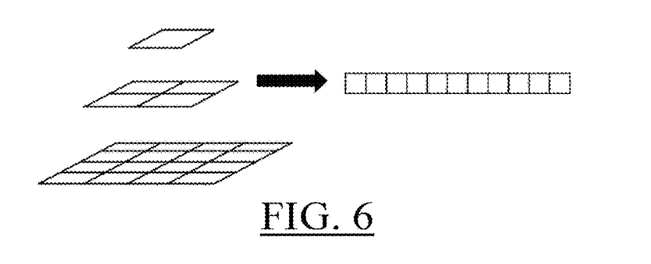

In specific, the multi-resolution system (e.g. a tree) may be mapped onto a linear storage (as shown on FIG. 6 which represents the multi-resolution system on the left and the linear storage on the right). Two maps which are close in the tree (vertically or horizontally) may be recorded close on the linear storage, because they are likely to be loaded one after the other.

Figure 7:
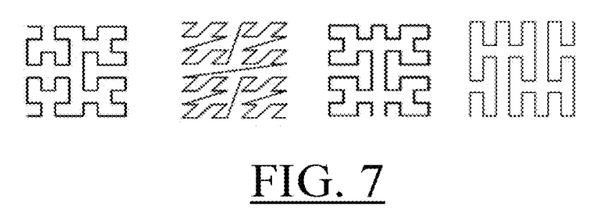

If only considering horizontal movements (moves in a single level of the tree): the memory storage achieves a high loading speed by presenting a good locality-preserving behavior. Selecting a space-filling curve, and in particular the Hilbert curve is thus particularly efficient. The following URL provides details: http://en.wikipedia.org/wiki/Hilbert_curve. FIG. 7 shows examples of space-filling curves: from the left to the right, a Hilbert curve, a Morton curve, a Moore curve and a Peano curve. The Hilbert curve proves to be the best choice for horizontal moves.

Figure 8:
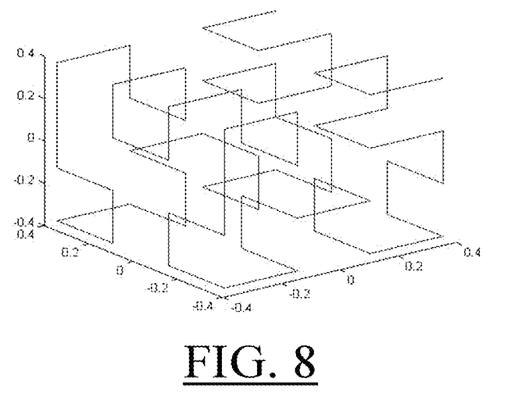

Now if ones considers horizontal and vertical movements in the multi-resolution system, an issue is to determine how the indexation with a Hilbert curve can fit. This amounts to adding a third dimension to the horizontal move problem. Space-filling curves like Hilbert curves have 3D variants (and even n-D variants) but known variants are designed for "cube-shaped" spaces: the levels above and below have the same dimensions and the locality-preserving behavior is only guaranteed in that case. This is shown on FIG. 8. A multi-resolution map system is more likely to have a "pyramid-shaped" form.

Figure 9:
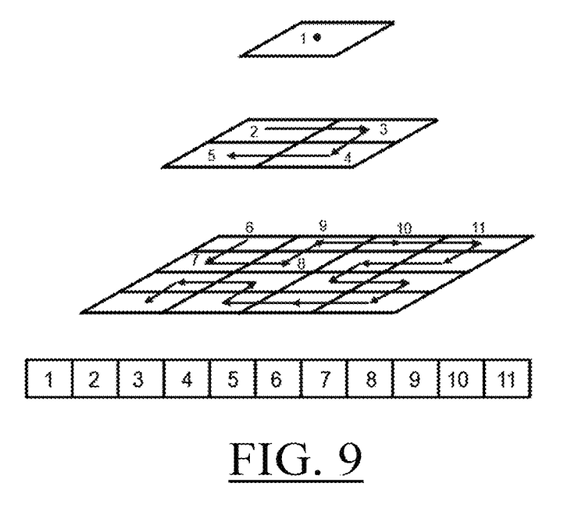
Figure 10:
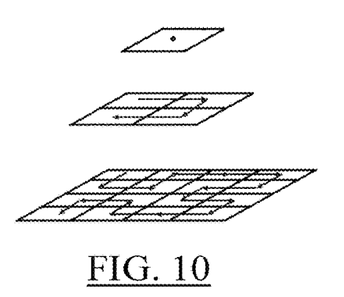
Figure 11:
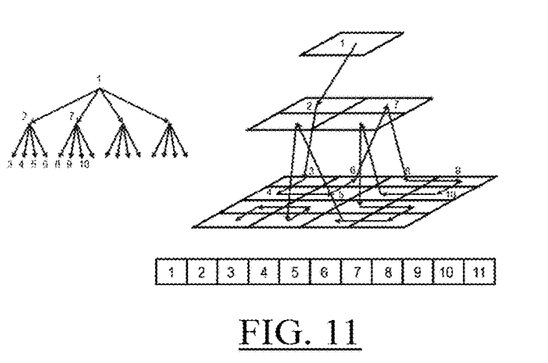
Figure 12:
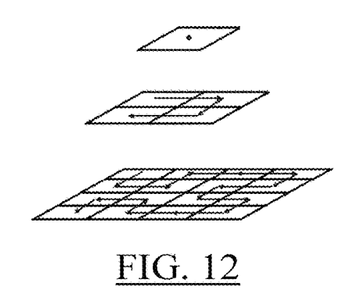
Figure 13:
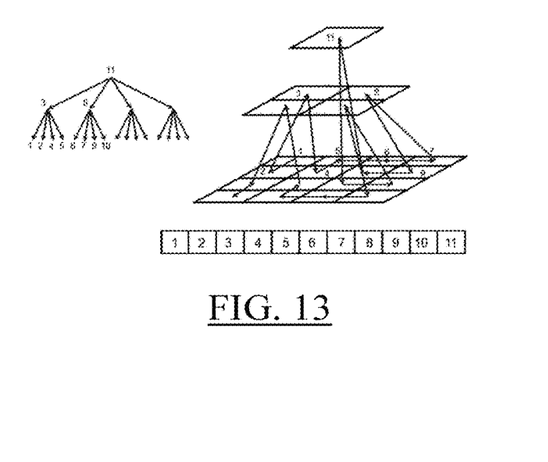

One idea (not the one retained in examples) is thus to proceed level-by-level, and to map each level of the multi-resolution system to a 1D segment by using the indexation with a Hilbert curve. This is shown on FIG. 9. It was already mentioned that for horizontal movements, this solution proves to be the best one. However this solution is not optimal for "zoom in/zoom out" moves as the distance between the clusters of two maps M1, M2 which are in different levels N and N+1 is huge. For combination of both horizontal and vertical moves, this solution is not optimal, unlike the retained solution of the examples discussed above.

In an example the space-filling curves proposed herein maps the multi-resolution system to a linear space. It stays close to Hilbert curves as this ensures the best performance with horizontal moves. It visits above/below levels quite often so that vertical moves ("zoom in/zoom out") are not completely penalized. These conditions ensure that the new curve has a good locality-preserving behavior if one moves horizontally, vertically or both in the multi-resolution system.

In an example, it may thus be provided a software component which acts according to the following. Once the database (multi-resolution system of maps/images) is set and not modified, the software component traverses the database. Images files are indexed with the space-filling curve. Clusters containing the corresponding data are gathered and reorganized to reflect the order given by the indexation. As long as the database is not modified, the software component does need to be called again. Any 3D applications with terrain rendering using this database sees its performance boosted. Indexation with the specific space-filling curve leads to good performance if both horizontal and vertical moves or a combination of both are allowed.

In an example, it may thus be provided a computerized method to store efficiently a set of images (and in an example a multi-resolution system of maps for terrain rendering purpose) on a computerized linear storage, so that any applications that need to load images from this set of images, e.g. for terrain rendering purpose (2D or 3D) will have its loading times slightly boosted. This computerized method does not need to be executed during and between several uses of the terrain rendering applications, if the database (set of images) remains unchanged.

Such method may work like a disk defragmenter as it may move clusters on the disk to optimized data access. It does however dedicate operation to optimize performance for terrain rendering applications. Given a multi-resolution system of maps/images (which are stored as images files on the disk), the method traverses the multi-resolution system. Images files are indexed with a specific space-filling curve. Clusters containing the corresponding data are gathered and reorganized to reflect the order given by the indexation. The specific space-filling curve may be built as mentioned previously. It maps the multi-resolution system to a linear space. It stays close to Hilbert curves as this ensures the best performance with horizontal moves. It visits above/below levels quite often so that vertical moves ("zoom in/zoom out") are not completely penalized.

In the following, two alternative examples of an efficient "space-filling curve" are discussed with reference to FIGS. 10-13.

In the first example, the space-filling curve traverses all the tiles of the map having the second resolution that cover together the zone, before traversing the tile to which they are associated. In other words, referring to the quad tree representation of the multi-resolution system mentioned earlier, all children of a node are traversed by the space-filling curve before (or equivalently, after) the parent node is traversed. This amounts to first sorting each level with a Hilbert curve (as shown on FIG. 10), and then to interlacing the results so that each image in a level is followed by all the images of its branch in the multi-resolution system (as shown on FIG. 11).

In the second example, the space-filling curve traverses a part (e.g. exactly half) of the tiles of the map having the second resolution that cover together the zone, before traversing the tile to which they are associated. In other words, half of the children of a node are re traversed by the space-filling curve before (or equivalently, after) the parent node is traversed, and then the other half is traversed. This amounts to first sorting each level with a Hilbert curve (as shown on FIG. 12), and the interlacing the results so that each image in a level is inserted in the middle of the images of its branch the multi-resolution system (as shown on FIG. 13).

The invention claimed is:

1. A non-transitory memory storage having a physical linear track and having recorded thereon a multi-resolution image system of an object, the multi-resolution image system including a set of images,
   each image representing the object and having a respective level of resolution, the physical linear track comprising a set of recording blocks,
   the set of recording blocks including:
   sets of third recording blocks all respective to a plurality of levels of the multi-resolution image system,
   wherein included in the third recording blocks are pairs including a first recording block and a second recording block adjacent one to another on the physical linear track, the first block having recorded thereon at least part of a first image having a first resolution, the second block having recorded thereon at least part of a second image having a second resolution, the second resolution being a level above the first resolution in the multi-resolution image system, and
   each third recording block of a set of third recording blocks having recorded thereon a respective part of an image of the set of images having one level of resolution,
   said respective parts of the image being arranged along at least a continuous portion of a 2D space-filling Hilbert curve defined for the image of the set of images, at least two respective parts arranged along the continuous portion of the 2D space filling curve being respectively recorded on two third recording blocks adjacent to one another on the physical linear track.

2. The non-transitory memory storage of claim 1, wherein at least one set of third recording blocks comprises at least two sub-sets of third recording blocks, the at least two sub-sets being separated on the physical linear track by at least one third recording block of another set of third recording blocks, each third recording block of the at least one set having recorded thereon at least a part of an image of the set of images having a first level of resolution, each third recording block of the another set having recorded thereon at least a part of an image of the set of images having a second level of resolution, the second level of resolution being different from the first level of resolution.

3. The non-transitory memory storage of claim 1, wherein the object is a terrain and the images are maps.

4. A computer-implemented method for object rendering based on a non-transitory memory storage having a physical linear track and having recorded thereon a multi-resolution image system of an object, the multi-resolution image system including a set of images, each image representing the object and having a respective level of resolution, the physical linear track comprising a set of recording blocks, the set of recording blocks including:
  sets of third recording blocks all respective to a plurality of levels of the multi-resolution image system,
  wherein included in the third recording blocks are pairs including a first recording block and a second recording block adjacent one to another on the physical linear track, the first block having recorded thereon at least part of a first image having a first resolution, the second block having recorded thereon at least part of a second image having a second resolution, the second resolution being a level above the first resolution in the multi-resolution image system, and
  each third recording block of a set of third recording blocks having recorded thereon a respective part of an image of the set of images having one level of resolution, said respective parts of the image being arranged along at least a continuous portion of a 2D space-filling Hilbert curve defined on the image of the set of images, at least two respective parts arranged along the continuous portion of the 2D space filling curve being respectively recorded on two third recording blocks adjacent to one another on the physical linear track, the method comprising:
  rendering at least a part of one or several of the images of the multi-resolution image system of the object, the rendering being updated according to continuous horizontal and/or vertical moves within the images.

5. The non-transitory memory storage of claim 4, wherein the object is a terrain and the images are maps.

6. A non-transitory computer readable storage medium having recorded thereon a computer program, the computer program comprising instructions for performing a computer-implemented method for object rendering based on a non-transitory memory storage having a physical linear track and having recorded thereon a multi-resolution image system of an object, the multi-resolution image system including a set of images, each image representing the object and having a respective level of resolution, the physical linear track comprising a set of recording blocks, the set of recording blocks including:
  sets of third recording blocks all respective to a plurality of levels of the multi-resolution image system,
  wherein included in the third recording blocks are pairs including a first recording block and a second recording block adjacent one to another on the physical linear track, the first block having recorded thereon at least part of a first image having a first resolution, the second block having recorded thereon at least part of a second image having a second resolution, the second resolution being a level above the first resolution in the multi-resolution image system, and
  each third recording block of a set of third recording blocks having recorded thereon a respective part of an image of the set of images having one level of resolution, said respective parts of the image being arranged along at least a continuous portion of a 2D space-filling Hilbert curve defined on the image of the set of images, at least two respective parts arranged along the continuous portion of the 2D space filling curve being respectively recorded on two third recording blocks adjacent to one another on the physical linear track, the method comprising:
  rendering at least a part of one or several of the images of the multi-resolution image system of the object, the rendering being updated according to continuous horizontal and/or vertical moves within the images.

7. The non-transitory memory storage of claim 6, wherein the object is a terrain and the images are maps.

8. A non-transitory computer readable storage medium having recorded thereon a computer program, the computer program comprising instructions for producing a non-transitory memory storage having a physical linear track and having recorded thereon a multi-resolution image system of an object, the multi-resolution image system including a set of images, each image representing the object and having a respective level of resolution, the physical linear track comprising a set of recording blocks, the set of recording blocks including:
  sets of third recording blocks all respective to a plurality of levels of the multi-resolution image system,
  wherein included in the third recording blocks are pairs including a first recording block and a second recording block adjacent one to another on the physical linear track, the first block having recorded thereon at least part of a first image having a first resolution, the second block having recorded thereon at least part of a second image having a second resolution, the second resolution being a level above the first resolution in the multi-resolution image system, and
  each third recording block of a set of third recording blocks having recorded thereon a respective part of an image of the set of images having one level of resolution, said respective parts of the image being arranged along at least a continuous portion of a 2D space-filling Hilbert curve defined on the image of the set of images, at least two respective parts arranged along the continuous portion of the 2D space filling curve being respectively recorded on two third recording blocks adjacent to one another on the physical linear track.

9. A system comprising:
a moving head configured to read a physical linear track of a memory storage,
a processor coupled to a graphical user interface, to a memory having recorded thereon the memory storage, the memory storage having a linear track and having recorded thereon a multi-resolution image system of an object, the multi-resolution image system including a set of images, each image representing the object and having a respective level of resolution, the physical linear track comprising a set of recording blocks, the set of recording blocks including:
sets of third recording blocks all respective to a plurality of levels of the multi-resolution image system,
wherein included in the third recording blocks are pairs including a first recording block and a second recording block adjacent one to another on the physical linear track, the first block having recorded thereon at least part of a first image having a first resolution, the second block having recorded thereon at least part of a second image having a second resolution, the second resolution being a level above the first resolution in the multi-resolution image system, and
each third recording block of a set of third recording blocks having recorded thereon a respective part of an image of the set of images having one level of resolution, said respective parts of the image being arranged along at least a continuous portion of a 2D space-filling Hilbert curve defined on the image of the set of images, at least two respective parts arranged along the continuous portion of the 2D space filling curve being respectively recorded on two third recording blocks adjacent to one another on the physical linear track.

10. The system according to claim 9, wherein the recording is according to a continuous injection from the 2D space-filling Hilbert curve of the set of images to the linear track, the 2D space-filling Hilbert curve interlacing different images, and the intersection between the 2D space-filling Hilbert curve and each respective image being on the 2D space-filling Hilbert curve defined on the respective image and which supports the 2D space-filling Hilbert curve when the 2D space-filling Hilbert curve traverses the respective image, said respective parts of the multi-resolution image system being arranged along at least a portion of the 2D space-filling Hilbert curve defined on the multi-resolution image system and which supports the 2D space-filling Hilbert curve when the 2D space-filling Hilbert curve traverses the respective image, the 2D space-filling Hilbert curve consists of the intersection between the 2D space-filling Hilbert curve and all images, and links between pairs of images, a link always being between an image having a first resolution and an image having a second resolution, the second resolution being next above the first resolution in the multi-resolution image system, the images each comprise tiles that each cover a respective zone, each tile of the image having the first resolution being associated to the tiles of the image having the second resolution that cover together the zone respective to the tile to which they are associated.

11. The system of claim 10, wherein the space-filling curve traverses all the tiles of the image having the second resolution that cover together the zone, before traversing the tile to which they are associated.

12. The system of claim 10, wherein the space-filling curve traverses a part of the tiles of the image having the second resolution that cover together the zone, before traversing the tile to which they are associated.

13. The system of claim 12, wherein the part of the tiles is half of the tiles.

14. The system of claim 9, wherein the object is a terrain and the images are maps.

15. The system of claim 9, wherein the object is a terrain and the images are maps.

16. The non-transitory memory storage according to claim 1, wherein the recording is according to a continuous injection from the 2D space-filling Hilbert curve of the set of images to the linear track, the 2D space-filling Hilbert curve interlacing different images, and the intersection between the 2D space-filling Hilbert curve and each respective image being on the 2D space-filling Hilbert curve and which supports the 2D space-filling Hilbert curve when the 2D space-filling Hilbert curve traverses the respective image, said respective parts of the multi-resolution image system being arranged along at least a portion of the 2D space-filling Hilbert curve defined on the multi-resolution image system and which supports the 2D space-filling Hilbert curve when the 2D space-filling Hilbert curve traverses the respective image.

17. The non-transitory memory storage of claim 16, wherein the space-filling curve consists of the intersection between the space-filling curve and all images, and links between pairs of images, a link always being between an image having a first resolution and an image having a second resolution, the second resolution being the level above the first resolution in the multi-resolution image system.

18. The non-transitory memory storage of claim 17, wherein the images each comprise tiles that each cover a respective zone, each tile of the image having the first resolution being associated to the tiles of the image having the second resolution that cover together the zone respective to the tile to which they are associated.

19. The non-transitory memory storage of claim 18, wherein for each respective tile of the image having the first resolution and associated to respective tiles of the image having the second resolution, the space-filling curve traverses all the respective tiles of the image having the second resolution, before traversing the respective tile of the image having the first resolution.

20. The non-transitory memory storage of claim 18, wherein for each respective tile of the image having the first resolution and associated to respective tiles of the image having the second resolution, the space-filling curve traverses a part of the respective tiles of the image having the second resolution, before traversing the respective tile of the image having the first resolution.

21. The non-transitory memory storage of claim 20, wherein the part of the tiles is half of the tiles.

22. A method for recording a multi-resolution image system of an object on a memory storage having a physical linear track comprising a set of recording blocks, the multi-resolution image system including a set of images, each image representing the object and having a respective level of resolution, comprising:
    recording sets of third recording blocks all respective to a plurality of levels of the multi-resolution image system,
    wherein included in the third recording blocks are pairs including at least part of a first image having a first resolution on a first recording block and a second image having a second resolution on a second recording block, the second recording block being adjacent to the first recording block on the physical linear track, the second resolution being a level above the first resolution in the multi-resolution image system, and
    each third recording block of a set of third recording blocks having recorded thereon a respective part of an image of the set of images having one level of resolution, the respective parts of the image being arranged along at least a continuous portion of a 2D space-filling Hilbert curve defined on the image of the set of images, at least two respective parts arranged along the continuous portion of the 2D space filling curve being respectively recorded on two third recording blocks adjacent to one another on the physical linear track.

23. The method of claim 22, wherein the recording is performed sequentially and continuously into adjacent recording blocks.

* * * * *